May 24, 1927.

F. R. RYBERG 1,629,740

CLEANING MECHANISM

Filed Jan. 3, 1922

Inventor

Fritz R. Ryberg

By Geo. A. Pitts  Attorney

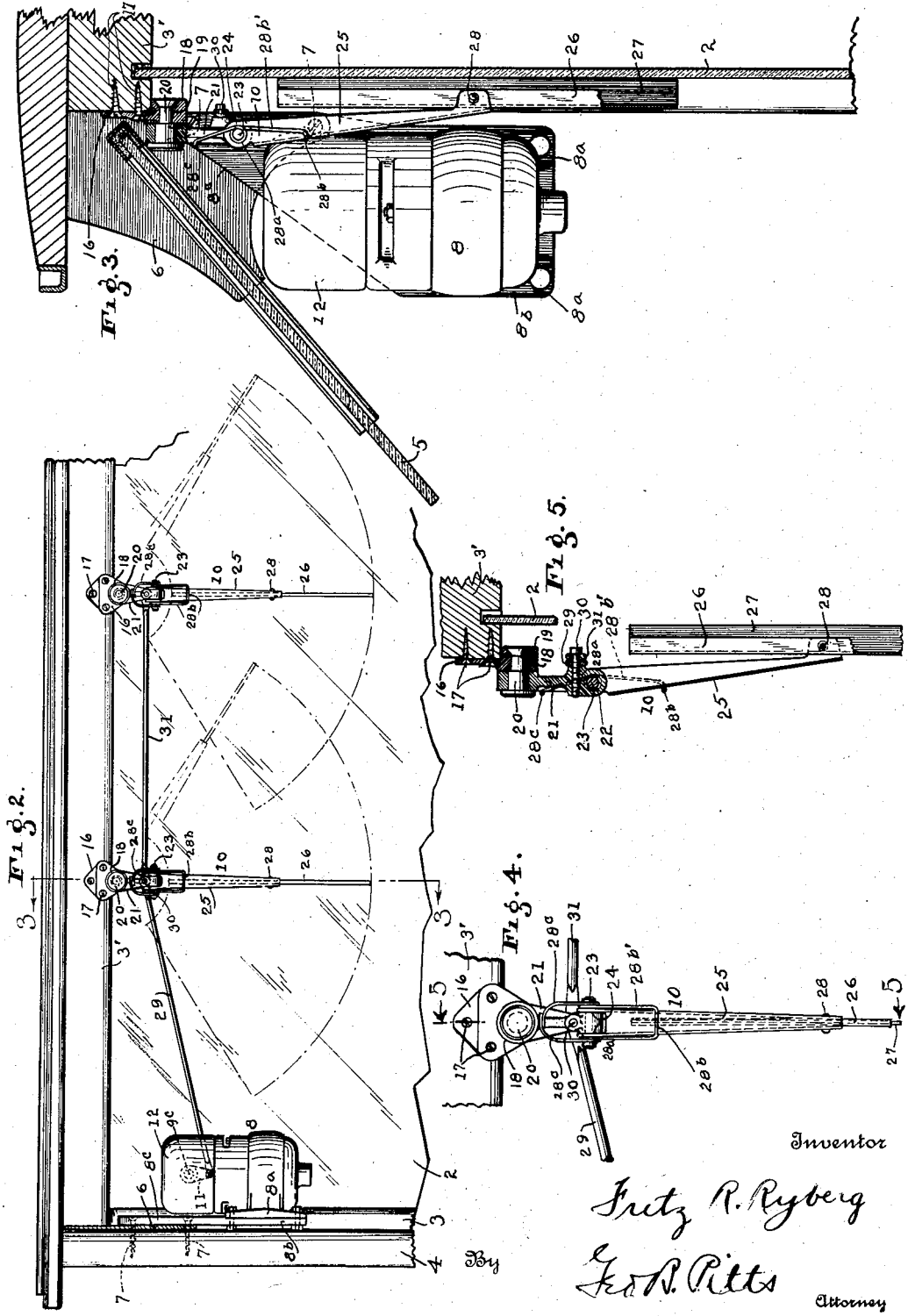

Patented May 24, 1927.

1,629,740

UNITED STATES PATENT OFFICE.

FRITZ R. RYBERG, OF CLEVELAND, OHIO.

CLEANING MECHANISM.

Application filed January 3, 1922. Serial No. 526,474.

This invention relates to a cleaning mechanism for windows, it being particularly adapted for cleaning wind-shields of vehicles.

One object of the invention is to provide an improved mechanism of this character of simple construction and capable of easy attachment to a vehicle body.

Another object of the invention is to provide a power driven cleaning mechanism of relatively simple construction and of such size that it may be entirely mounted on the outside of the vehicle in juxtaposition to the wind-shield, but out of the line of vision of the operator or driver.

My invention in its preferred form has been designed for adaption to an electric driven vehicle wherein a current of relatively high voltage is required to drive the same; accordingly, my invention has for another object to provide a cleaning mechanism in which the cleaning devices are operated by an electric motor, driven from the same source of current that operates the driving motor for the vehicle.

Some vehicles now in use are provided with front and rear driving seats and operating mechanisms and in most instances, in such vehicles the operator occupies the rearmost driving seat. Under these circumstances it is highly desirable to continuously maintain transparent and clear a larger portion of the wind-shield than is required by the operator when occupying the front driving seat or in vehicles where but one seat immediately behind the shield is provided. My invention therefore has for a further object to provide a mechanism which serves to clean and maintain clean a portion of the wind-shield extending substantially from side edge to side edge of the wind-shield, so that the operator can operate the car with ease and efficiency no matter how remote he may be positioned from the shield.

Other objects of the invention will be apparent to those skilled in the art to which my invention relates from the following description taken in connection with the accompanying drawings.

Referring to the drawings, Fig. 1 is a perspective view of an electric vehicle to which is applied a cleaning mechanism embodying my invention.

Fig. 2 is a fragmentary front view of the vehicle and the cleaning mechanism in position thereon (the visor for the wind-shield being omitted to facilitate the illustration).

Fig. 3 is a section on the line 3—3 of Fig. 2.

Fig. 4 is a front elevation of one of the cleaning devices.

Fig. 5 is a section on the line 5—5 of Fig. 4.

Figure 6:
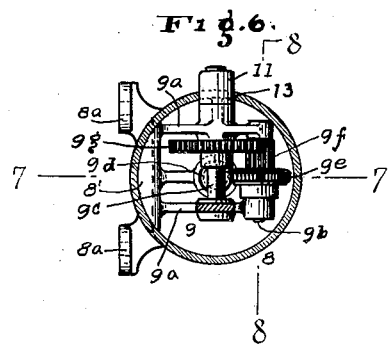
Fig. 6 is a section on the line 6—6 of Fig. 7.
Figure 7:
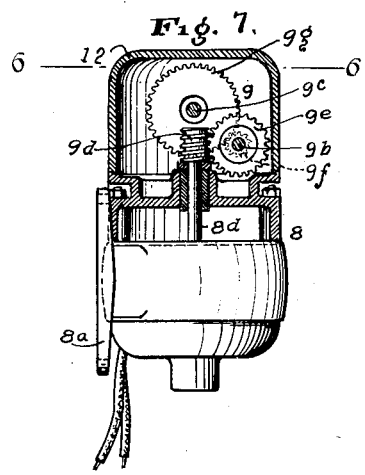
Figure 8:
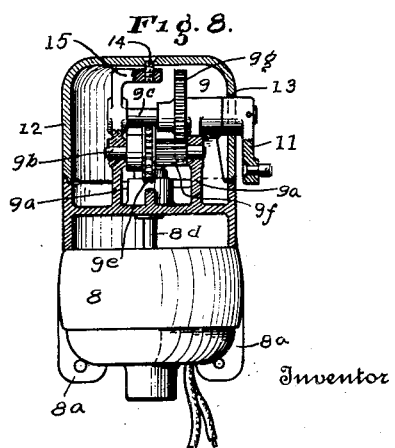

Figs. 7 and 8 are elevational views of the motor partly in section, on the lines 7—7 and 8—8, respectively, of Fig. 6.

In the drawings, 1 indicates as an entirety a self driven vehicle. The invention herein to be described may be applied to any kind of vehicle, such as a gas or electric driven automobile, a street car, a locomotive or in connection with any surface to be cleaned, but by reason of its preferred application and because the invention is most advantageous for vehicles wherein a relatively high voltage current is utilized, I have chosen to show herein an electrically driven type of vehicle. In standard vehicles of this type the batteries therefor are usually designed to supply a current of approximately 80 volts. The vehicle 1 may be of any desired construction, it including a wind-shield, such as a sheet of glass 2, preferably supported at its side and lower edges in a sash 3 and engaging at its upper edge a transverse member 3'. The sash 3 may be adjustably or removably mounted in the frame 4, which forms a part of the vehicle body. 5 indicates a visor disposed at the upper end of the frame 4 and depending downwardly and outwardly relative thereto to serve as a protector for the glass 2. The visor may be a permanent part of the body of the vehicle 1 incorporated in its frame construction, or an attachment thereto, as shown in the drawings. In the illustrated form of construction, the visor preferably extends entirely across the front of the vehicle 1 and is supported at its opposite ends by a pair of plates 6 secured to the inner side faces of the frame 4 by screws 7 or other suitable devices.

8 indicates an electric motor arranged, through a suitable reduction gearing 9, to oscillate one or more cleaning devices, each indicated as an entirety at 10.

Figure 1:
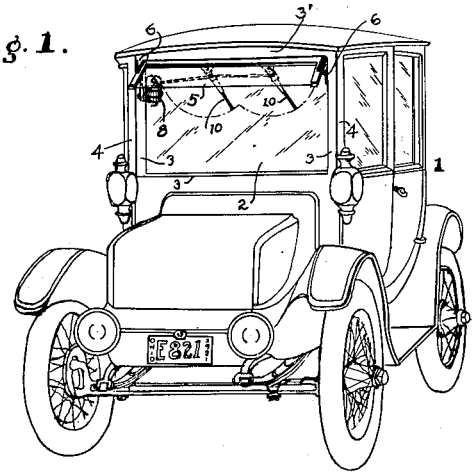

The motor 8 is preferably a relatively high voltage motor, whereby it may be applied to an electric driven vehicle and connected with the same batteries which drive the motor (not shown) for the vehicle, thereby simplifying the mechanism as a whole and its installation on the vehicle, as well as avoiding unnecessary expense. Because of its adaptation for operation by a high voltage current, the motor 8 is relatively small and hence may be advantageously applied at one side of the wind-shield supporting frame 4 outside the vehicle 1, for direct connection with the cleaning device or devices 10 without obstructing the view through the wind-shield glass 2; in fact, the motor 8 is small enough to substantially fit underneath or behind the visor 5, where it is preferably supported, as shown in Fig. 3. Without changing the size of the motor 8, it may be wound for operation by a current of any voltage from 12 volts upwards, thereby adapting the mechanism for vehicles other than of the electric driven type. The motor 8 is preferably arranged vertically and parallel to that side member of the frame 4 remote from the operator's driving seat; Fig. 1 showing a left-hand type of drive car and the motor 8 supported on the right side member. The casing of the motor 8 is preferably provided with a pair of feet $8^a$, which may be bolted or otherwise secured to a bracket $8^b$. The bracket $8^b$ is secured to the frame 4 in any desired manner, but preferably by the two screws 7 used for securing the adjacent visor supporting plate 6 thereto. The bracket $8^b$ is shaped at its upper end to be disposed parallel to the sash 3 and formed with suitable openings spaced to align with the openings in the visor plate 6 and frame 4, which receive the screws 7, so that upon the removal of the screws 7, the bracket may be positioned against the plate 6 and secured thereto by the said screws. The upper front edge of the bracket $8^b$ is cut away, as shown at $8^c$ to avoid engagement with the visor 5.

Of the reduction gearing 9, $9^a$, $9^a$, indicates a pair of spaced standards or walls, preferably cast integrally with the motor casing and extending laterally from the wall $8'$ thereof. The standards or walls $9^a$, $9^a$, are formed with bearings and so disposed that they support in the bearings shafts $9^b$, $9^c$, with gears thereon in proper meshing engagement. $9^d$ indicates a worm fixed to the armature shaft $8^d$ of the motor 8 and meshing with a worm $9^e$ fixed to the shaft $9^b$. $9^f$ indicates a spur pinion fixed to the shaft $9^b$ and meshing with a spur gear $9^g$ fixed to the shaft $9^c$ to drive the latter. The shaft $9^c$ is extended at one end and provided with a crank arm 11, the purpose of which will be later set forth. As shown in the drawings the elements of the reduction gearing 9 are so arranged that the shaft $9^c$ extends horizontally in a direction longitudinally of the vehicle and the crank arm 11 is disposed on that side of the motor 8 adjacent to the wind-shield, thus positioning the arm 11 relatively close to the latter and enabling it to transmit its power to operate the cleaning devices 10 in a transverse direction and substantially coincident with the plane in which the devices 10 oscillate. From the foregoing description it will be seen that I provide two reductions in speed between the armature shaft $8^d$ and the shaft $9^c$, thereby insuring the proper speed for the latter shaft.

12 indicates a cover or casing shaped to fit the upper end of the motor casing and to enclose the reduction gearing 9. At one side, the casing 12 is formed with an opening 13 through which the extended end of the shaft $9^c$ projects. The opening 13 is preferably of a size to receive the hub portion of the crank arm 11. The casing 12 is preferably secured in position by a screw 14 engaging at its inner end a bracket 15 formed integrally with one of the standards $9^a$. The cover 12 not only protects the power transmitting elements 9, but also encloses the upper end of the armature shaft $8^d$ and thus prevents water and dust or dirt from getting in and damaging the motor. Although the motor 8 is positioned underneath the visor 5, I prefer to make the motor casing and the joint between the casing and the cover 12 liquid tight and also to exteriorly finish these parts to resist the exposure to which they are subjected.

Of the cleaning device 10, 16 indicates a plate adapted to be secured to the exterior surface of the transverse member $3'$ by one or more screws 17. The plate 16 has a depending member 18 which is formed with an opening 19 preferably arranged horizontally and extending in a longitudinal direction and at substantially right angles to the wind-shield 2. The opening 19 is arranged to receive and support a stud shaft 20. At its outer end the shaft 20 swingably supports a link 21. The free end of the link is formed with an opening 22, extending horizontally in a transverse direction. The opening 22 forms a bearing for a pivot pin 23 which, at its opposite ends, projects through openings formed in the bifurcations 24 of an arm 25. 26 indicates a supporting member pivotally connected at 28 in any well known manner at a point intermediate its ends to the free end of the arm 25 and arranged to hold or clamp a squeegee 27 which is adapted to engage with and traverse a portion of the wind-shield 2. The supporting member 26 preferably comprises a section of metal folded on a longitudinal line to clamp one longitudinal edge of the squeegee 27 between the folded portions. The arm 25 is preferably acted upon by a spring to normally swing it about the pivot pin 23 in a direction toward the wind-shield 2, such operation serving to yieldingly support the squeegee in engagement therewith. This arrangement is preferably effected by means of a spring 28$^a$ which has a section 28$^b$ engaging the arm 25 and legs 28$^{b\prime}$ each coiled around one end of the pin 23 and then extending upwardly and laterally across the link 21, as shown at 28$^c$. This construction permits the squeegee 27 to readily engage the wind-shield 2 throughout its entire length whether the wind-shield is disposed vertically or is inclined to the vertical.

29 indicates a pitman pivotally connected at one end of the crank arm 11. The opposite end of the pitman is pivotally connected to the extended end of a shaft 30 having a threaded end fitting a screw threaded opening formed in the link 21 near its free end. The crank arm 11 through the pitman 29 serves to oscillate the link 21, arm 25, member 26 and squeegee 27 about the pivot or shaft 20, whereby the squeegee cleans and maintains clean that portion of the wind-shield within the limits of its movement, as shown in dotted lines in Figs. 1 and 2. I preferably provide a plurality of cleaning devices and space them so that the area cleaned by one of them overlaps the area cleaned by the adjacent device or devices, thereby providing for the cleaning of a relatively wide area of the shield 2 transversely or substantially from side edge to side edge thereof. In the drawings I have shown two cleaning devices; when more are provided they may be uniformly spaced relative to each other. When two or more cleaning devices 10 are provided, adjoining devices are connected together by a rod 31, pivotally connected at its opposite ends to the shafts 30. This arrangement positions the rod relatively close to the transverse member 3' out of the field of vision of the operator; it also permits the power of the crank arm 11 and pitman 29 to be transmitted direct to each cleaning device without strains and resulting wear upon the parts of each device.

From the foregoing description it will be seen that I have provided a power driven cleaning mechanism for a vehicle capable of being readily attached thereto. It will also be seen that I provide a mechanism in which two or more cleaning devices may be provided and operated from a single source of power mechanism in a relatively simple manner.

Furthermore, my mechanism is of such construction that it is readily attachable to an electrically driven automobile and operated by the relatively high voltage current required for operating the car. I attain this meritorious result by utilizing a high voltage motor to operate the cleaning devices, making it unnecessary to provide extra or special equipment or special storage battery cells. This construction is advantageous for the reason that it admits of the use of a small motor which may be rigidly placed directly on the side frame of the vehicle adjacent the wind-shield without obstructing the operator's view; this arrangement in turn permits the motor to be connected directly to the cleaning devices in a simple, economical manner and to operate the same without loss of power.

To those skilled in the art to which my invention belongs, many alterations in construction and widely differing embodiments and applications of my invention will suggest themselves without departing from the spirit and scope thereof. My disclosures and description herein are purely illustrative and are not intended to be in any sense limiting.

What I claim is:

1. In a cleaner for a windshield for a vehicle having a frame in which is mounted a windshield glass, a cleaning device adapted to be pivotally mounted on the outside of the vehicle frame above the windshield glass and depending therefrom in front of the glass to move thereover, a motor adapted to be supported on the outside of the vehicle frame adjacent one side edge of the windshield glass and remote from the driver, a pitman connected at one end to said cleaning device, and driving means, including a reduction gearing connected to the shaft of said motor and a crank connected to the other end of said pitman for operating said pitman.

2. In a cleaning mechanism, the combination of a plate adapted to be secured to the outer side of a windshield frame, a pivot supported by said plate at substantially right angles to the windshield, a link pivoted on said pivot and arranged to support at its lower end a pivot pin extending horizontally parallel to the windshield, an arm pivoted at its upper end on said pivot pin, a squeegee pivoted intermediate its ends to the lower end of said arm, a spring coiled around said pivot pin and engaging said link and arm for maintaining said squeegee in yielding engagement with the windshield, and power means supported on the outer side of said windshield frame and connected to said link for swinging it about said pivot.

3. In a windshield cleaning mechanism for vehicles, a motor adapted to be attached exteriorly of the windshield frame and at that side edge thereof remote from the driver, gearing driven by said motor, a pivot mounted on the front side of the windshield frame in spaced relation to said motor, a link mounted on said pivot, a connecting rod between said link and said gearing, and an arm mounted on said link and provided with an element for cleaning the outer surface of the windshield and adapted to be swung about the axis of said pivot by said rod through the movement of said actuated gearing.

4. A cleaner mechanism for an automobile windshield comprising a plurality of cleaner carrying arms spaced from each other and loosely pivoted to the outer side of the windshield frame and carrying cleaning devices adapted to engage the windshield glass and sweep thereover in the line of vision of the driver, means exterior of the windshield for connecting said arms together at points intermediate their ends to move them in unison, a motor mounted exteriorly of the vehicle and at that side edge of the windshield remote from the driver and out of line of the driver's vision, and operating connections between the shaft of said motor and the adjacent cleaner carrying arm and connected to the latter at a point intermediate its ends.

In testimony whereof I have hereunto subscribed my name.

FRITZ R. RYBERG.